(No Model.) 3 Sheets—Sheet 1.

B. V. NORDBERG.
STEAM ENGINE VALVE GEAR.

No. 497,285. Patented May 9, 1893.

Witnesses
E. C. Asmus
Chas. L. Goss

Inventor:
Bruno V. Nordberg
By Winkler Flanders Smith Bottum & Vilas
Attorneys.

(No Model.)  3 Sheets—Sheet 2.

B. V. NORDBERG.
STEAM ENGINE VALVE GEAR.

No. 497,285. Patented May 9, 1893.

Witnesses:
Inventor:
Bruno V. Nordberg,
By Winkler Flanders Smith Bottum & Vilas
Attorneys.

(No Model.) 3 Sheets—Sheet 3.

B. V. NORDBERG.
STEAM ENGINE VALVE GEAR.

No. 497,285. Patented May 9, 1893.

Witnesses
Geo. W. Young.
Chas. L. Goss.

Inventor
Bruno V. Nordberg,
By Winkler Flanders Smith Bottum & Vilas
Attorneys

UNITED STATES PATENT OFFICE.

BRUNO V. NORDBERG, OF MILWAUKEE, WISCONSIN, ASSIGNOR TO THE BRUNO NORDBERG COMPANY, OF SAME PLACE.

STEAM-ENGINE VALVE-GEAR.

SPECIFICATION forming part of Letters Patent No. 497,285, dated May 9, 1893.

Application filed August 29, 1892. Serial No. 444,383. (No model.)

*To all whom it may concern:*

Be it known that I, BRUNO V. NORDBERG, of Milwaukee, in the county of Milwaukee and State of Wisconsin, have invented certain new and useful Improvements in Steam-Engine Valve-Gear and Valves; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to automatic cut off engines, and its main objects are to produce a simple, durable, efficient valve gear for operating the steam admission valves to prevent noise, to permit of increasing the speed of this class of engines, to increase the range of cut off from zero to full stroke, to prevent wear or breaking of the engaging parts of the trip steels from interfering with the operation of the valves and thereby stopping the engine, to provide for immersing the trip steels in oil and thereby to prevent or diminish the wear thereof, to automatically relieve the cylinder of strain due to the presence of water therein, or to pressure in excess of the steam pressure arising from any other cause within the cylinder, and thereby avoid the bursting of or injury to the cylinder, to provide for and facilitate the removal of the exhaust valves and their seats and to prevent leakage from the cylinder around them, and generally to improve the valves and valve gear for this class of engines.

In the accompanying drawings like letters designate the same parts in the several figures.

Figure 1:
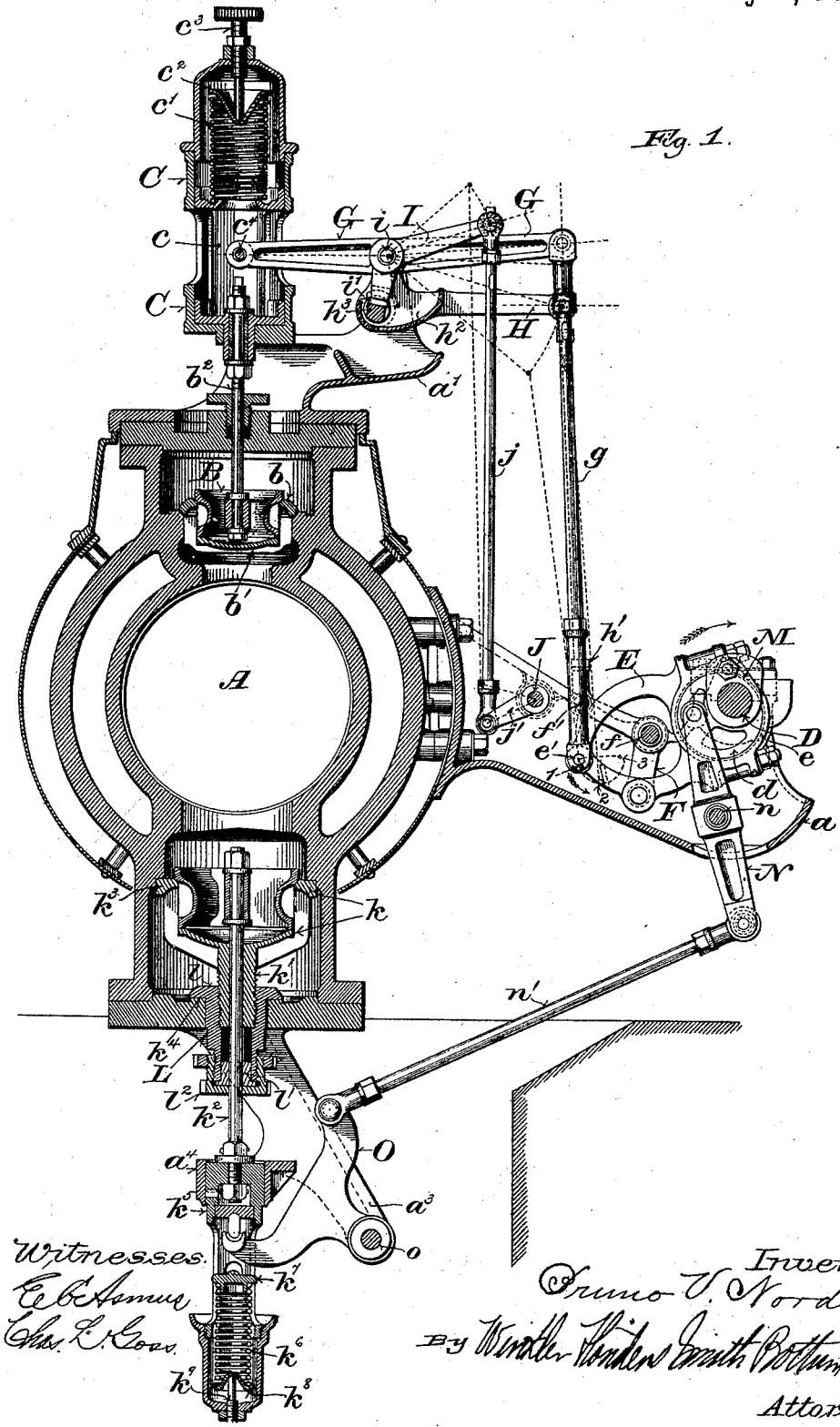
Figure 2:
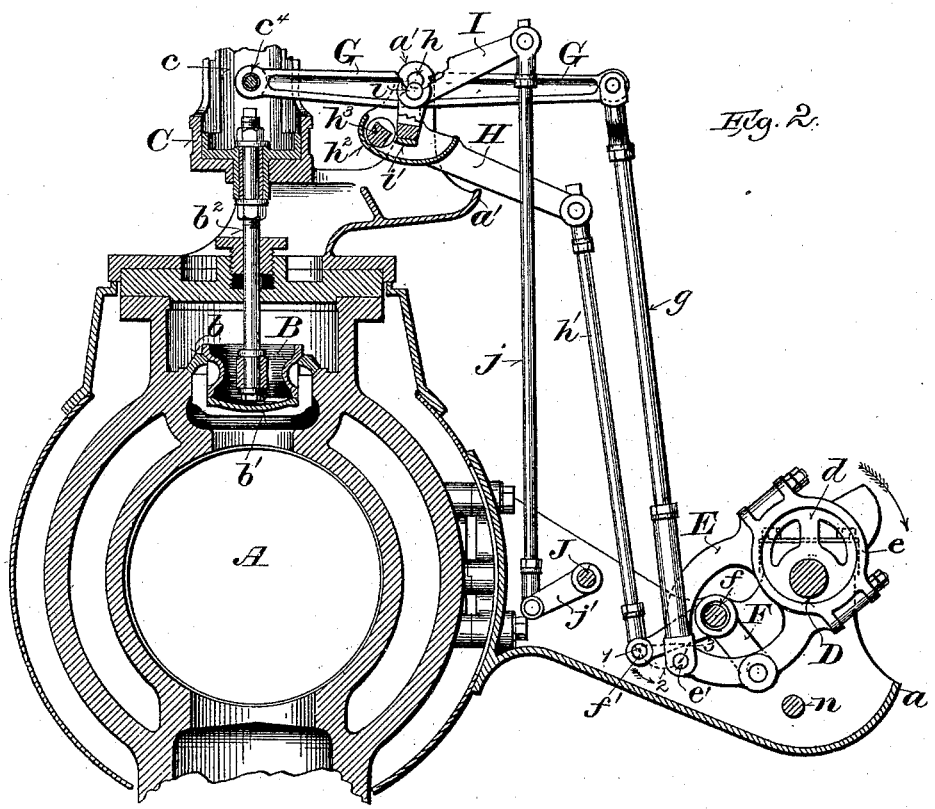
Figure 3:
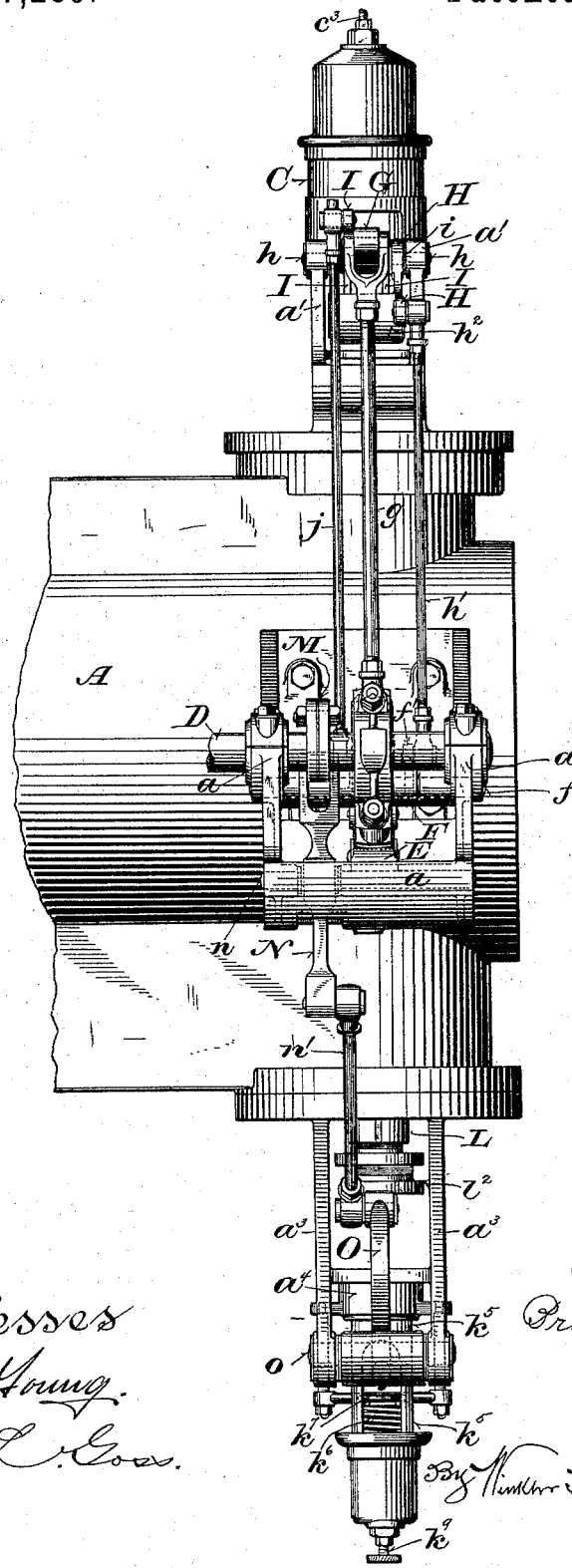

Figure 1 is a vertical cross section of an engine provided with my improved valves and valve gear, the valve gear at one end of the cylinder being shown in side elevation and in the position assumed by it just before opening the admission valve. Fig. 2 is a similar view showing the admission valve gear in the position occupied by it just after the release and closing of the valve; and Fig. 3 is a side elevation of a portion of the cylinder showing the valve gear at one end thereof.

For the purpose of illustration I have shown and will describe the valve gear at one end of the cylinder only, it being obvious that the valves and their connections are duplicated at both ends of the cylinder.

A is the cylinder, which may be of the usual or any suitable construction for the class of engines above mentioned.

B is a double beat puppet steam admission valve, and $b$ a double annular valve seat having a closed disk-shaped bottom $b'$ and fitted to and loosely inserted in an opening in the cylinder. The stem $b^2$ of said valve passing through a stuffing box in the steam chest or valve chamber cover, is attached at its outer end to a head or piston $c$, fitted and arranged to work within a cage or cylinder C. A spring $c'$, interposed between the upper or outer end of the head $c^4$ and an inverted cone-shaped follower $c^2$, is provided for closing the valve and holding it normally upon its seat, and a screw $c^3$ threaded in the upper end of the cap of cage C, bears at its end in the apex of the conical follower $c^2$ and serves to regulate the tension of the spring $c'$. The lower end of the cylinder C is closed and constitutes a dash-pot for the lower end of the head $c$, which is fitted therein and serves to check the valve B as it descends upon its seat.

D represents the lay shaft, which is geared or otherwise connected with the crank shaft of the engine so as to revolve synchronously therewith. It is supported parallel with the cylinder in brackets $a$, projecting therefrom, and is provided opposite each end of the cylinder with an eccentric $d$, with which is connected by a strap or box $e$, an arm E. This arm E, which for the purpose of symmetry and strength is preferably made heart-shaped, is linked by one arm of a bell crank lever F, to the bracket $a$, or other suitable fixed support, at $f$.

G is a lever pivoted at one end on a cross pin $c^4$ to the head $c$ and connected at the opposite end by a rod $g$ with the arm E, at $e'$.

H is a bell crank lever, the shorter arm of which is forked and pivoted, as shown in Fig. 2, at $h$, to and between ears on a bracket $a'$ attached to and projecting from the steam chest or valve chamber. The longer arm of said lever H is connected by a rod $h'$ with the other or free arm of the bell crank lever F, at $f'$. Between its forked arms said lever H is formed with an oil well $h^2$, and is provided therein with a cross bar $h^3$, which constitutes one of the trip blocks or steels.

I is a bell crank lever having its shorter arm forked and pivoted to opposite sides of the lever G, at $i$. To the end of its shorter arm is attached the other trip block or steel $i'$, while its longer arm is connected by a rod $j$, with a crank $j'$ on rock shaft J, parallel with the cylinder and connected with the governor (not shown). When the trip steels $h^3$ and $i'$ are in engagement, the pivot connection $i'$ of lever I with lever G is in line with the pivot connections of lever H with the bracket $a'$, and the engaging faces of said trip steels are formed to the segment of a cylinder with its axis coincident with the centers of pivots $h$ and $i'$, so that the lever G in lifting the valve B from its seat, will be supported upon said trip steels, and while they are in engagement the fulcrums of levers G, H and I will be coincident, or in a line passing through the pivots $h$ and $i'$.

The cylinder A is formed at each end on the opposite side from the steam chest or admission valve chamber, with an exhaust valve chamber, in which is fitted and held a double valve seat $k$, formed with a perforated externally threaded stem $k'$, through which the stem $k^2$ of valve K passes.

L is an internally threaded sleeve, formed at one end with a flange $l$, and fitted into and opening in the exhaust valve chamber cover, as shown in Fig. 1. It is extended outside of said cover, and constitutes a stuffing box for the valve stem $k^2$ passing through it, and is squared on the outside or provided with means by which it may be turned in the valve chamber cover and on the threaded stem $k'$ of the valve seat, which is thereby forced tightly against its bearing at $k^3$ in the valve chamber. The same operation forces the flange $l$ on the stuffing box tightly against the bearing $k^4$, to which it is fitted on the inside of the valve chamber cover.

The stuffing box L is screw threaded at its outer end, and is provided with a gland $l'$ inserted therein, and a screw cap $l^2$, by which said gland is adjusted and held in place and the packing is compressed. By this construction and arrangement of the exhaust valve chamber, seat and stuffing box, the valve and its seat may be readily removed together, and when worn or broken, may be easily repaired or replaced, and leakage of steam from the cylinder into the valve chamber between the valve seat and chamber at $k^3$, and from the valve chamber into the atmosphere between the stuffing box and valve chamber cover at $k^4$, is prevented, the joints at $k^3$ and $k^4$ being nicely fitted and tightly closed by turning the sleeve or stuffing box L upon the screw threaded stem $k'$, as above mentioned. Leakage of steam from the cylinder into the valve chamber between the stem $k'$ on the valve seat and the valve stem $k^2$, thence between the stuffing box L and said valve seat stem $k'$, also the leakage of steam from the valve chamber into the atmosphere between the valve seat stem $k'$ and the stuffing box are prevented by the packing in said stuffing box.

Opposite each exhaust valve the lay shaft D is provided with a cam M, as shown in Fig. 1, and a lever N, fulcrumed upon a cross rod $n$, in bracket $a$, is provided at its upper end with a friction roller in the path of cam M, and is connected at its lower end by a rod $n'$ with a lever O, which is fulcrumed at $o$ to a bracket $a^3$, formed with or attached to the exhaust valve chamber cover. The opposite end of lever O is pivotally connected with a head $k^5$, secured to the outer or lower end of the valve stem $k^2$ and supported and guided in a sleeve $a^4$ on the bracket $a^3$. The head $k^5$ is extended below and formed into a spring case, in which is inserted a spring $k^6$, bearing at its upper end against a disk $k^7$, attached as shown in Fig. 3, to the sleeve $a^4$. At its lower end said spring bears upon a conical follower $k^8$, resting upon an adjusting screw $k^9$, threaded in the lower end of said spring case, so as to afford means of adjusting the tension of said spring. The spring $k^6$, acting in opposition to the lever O in opening the valve, serves to close said valve and hold it normally upon its seat. The connecting rods $g$, $h'$, $j$ and $n'$, have right and left screw threaded connections at opposite ends with their heads, whereby they may be lengthened or shortened in the usual manner, for the purpose of adjusting the movement of the valve gear and valves as desired.

The cam M by which the exhaust valve is opened, is made of two parts, one of which is fixed upon the lay shaft D, and the other loosely mounted thereon and adjustably attached by a bolt to the fixed part, whereby the said cam may be readily and accurately adjusted so as to properly regulate the time of the opening and closing of the exhaust valve.

My improved valve gear and valves operate as follows: The lay shaft D, rotating with the crank shaft in the direction indicated by the arrow, causes the pivot connection $e'$ between arm E and connecting rod $g$, to describe an approximately semi-circular figure, as indicated by dotted lines in Figs. 1 and 2. The admission valve and its operating connections are shown in Fig. 1 in the position which they occupy just before the valve is opened, the trip steels $h^3$ and $i'$ being in engagement and affording a fulcrum for the valve opening lever G at a point between its ends in line with the fulcrum $h$ of lever H. As the pivot connection $e'$ at the lower end of connecting rod $g$ moves in the direction indicated by the arrow in Figs. 1 and 2, from 1 toward 2, in the descending curve of the semi-circular figure, lever G is turned on its pivot connection $i'$ with lever I, supported by the trip steels, and its inner end is raised, thereby lifting the valve B from its seat; at the same time the inner end of bell crank lever F, descending, turns lever H on its fulcrum $h$, thereby carrying the trip steel $h^3$ toward the valve stem out of engagement with the trip steel $i'$ on lever I, which is substantially fixed in position with relation thereto. The point in the movement of the valve gear where the trip steel $h^3$ clears the trip steel $i'$ will vary according to the relative position of the trip steel $i'$, which is controlled by its governor connections, an increase of speed in the engine tending to carry the trip steel $i'$ to the right and thereby causing an earlier cut off, and a decrease in speed tending to carry said trip steel to the left, thereby causing a later cut off. In this connection it should be stated that any wear on the engaging edges of the trip steels or the accidental breaking of either steel, will be compensated for by the governor without interfering with the operation of the engine, because any wearing away or breaking of the steels which would result in less engagement or lap thereof, producing an earlier cut off and consequently a decrease in the speed of the engine, would operate through the governor by moving the trip steel $i'$ to the left to increase the lap or engagement of the trip steels and thereby produce a later cut off and increase the speed of the engine. As soon as the trip steel $h^3$ is carried out of engagement with the trip steel $i'$, lever G, being unsupported between its ends is allowed to drop at its inner end, and the spring $c'$ instantly closes the valve B. Just after the closing of the valve its actuating connections occupy approximately the position in which they are shown in Fig. 2. As the pivot connection $e'$ at the lower end of rod $g$ describes the ascending curve of the semi-circular figure from 2 to 3, the outer end of lever G is correspondingly raised. While the lower end of connecting rod $g$ passes from 3 to 1, describing the approximately straight side of the semi-circular figure, the outer end of the valve opening lever G remains quiescent; at the same time, the outer end of lever H is raised by the bell crank lever F, the trip steel $h^3$ is carried to the right underneath the trip steel $i'$, and the admission valve operating gear again assumes the position in which it is shown in Fig. 1. While the lower end of said connecting rod is describing the descending portion of the curve from 1 to 2, the outer end of lever G is lowered to the full extent of its movement, and the valve B is quickly opened to the fullest extent.

It will be observed that the operation of valve B is effected by a very limited lateral movement of the lever G, and that the engagement and disengagement of the trip steels is effected by a movement thereof transversely to the direction of the movement of lever G. In this way a wide range of engagement of the trip steels is produced without bringing them abruptly or violently together, and noise and wear are thus avoided.

The cam M operating through the lever N, connecting rod $n'$ and lever O, upon the head $k^5$ on the lower end of the stem $k^2$, opens the exhaust valve K at the proper time, holding it open the desired interval of time according to the adjustment of said cam. When the cam M passes out of engagement with the friction roller in the upper end of lever N, said valve is closed by the spring $k^6$. When the exhaust valve or its seat is broken or becomes worn, or for any other reason requires inspection, they can be readily removed with the cover of the valve chamber in which they are placed. In case leakage should occur between the valve seat and chamber or between the stuffing box and valve chamber cover, it can be stopped without interrupting the operation of the engine by simply turning the sleeve or stuffing box L so as to force the valve seat $k$ and the flange $l$ on said stuffing box in opposite directions tightly against their bearings $k^3$ and $k^4$. Should the engine be started while water is in the cylinder which would subject it to internal pressure in excess of the steam pressure, the admission valve B with its seat $b$, will be lifted automatically, thereby instantly relieving the cylinder of a pressure and strain which might otherwise burst or injure it. While the train of connections between the valve B and the lay shaft D are constant and unbroken, they are such that said valve is free at all times to yield outwardly against the tension of spring $c'$ to an excessive pressure within the cylinder. By the construction and arrangement of the valve gear, and particularly of the trip steels and their connections, together with the oil well hereinbefore described, I am enabled to immerse and run the trip steels in oil, thereby preventing noise and greatly reducing the wear of said steels.

Various changes both in the construction and arrangement of parts hereinbefore described, may be made within the spirit and intended scope of my invention.

I claim—

1. The combination with an engine valve of a lever connected therewith for opening the same, and provided with a movable fulcrum support which is capable of being displaced or withdrawn to allow the valve to be closed, substantially as and for the purposes set forth.

2. The combination with an engine valve of a lever connected therewith and having a connection with the crank shaft for opening said valve, and a shifting fulcrum support arranged to be displaced or disengaged and withdrawn from the support of said lever to permit of the closing of said valve, substantially as and for the purposes set forth.

3. The combination with an engine valve of a lever connected therewith and having a connection with the crank shaft for opening said valve, and trip blocks or steels constituting the fulcrum support for said lever for opening the valve, one of said blocks or steels having a governor connection, substantially as and for the purposes set forth.

4. The combination with an engine valve of a lever connected therewith and having a connection with the crank shaft for opening said valve, and trip blocks or steels constituting the fulcrum support of said lever in opening said valve, one of said blocks or steels having a governor connection and the other a connection with the crank shaft, substantially as and for the purposes set forth.

5. The combination with an engine valve and lay shaft of a lever connected with said valve, an eccentric on said lay shaft, an arm connected with said eccentric and having a link connection with a suitable support and a rod pivoted to and connecting said arm and lever, substantially as and for the purposes set forth.

6. The combination with an engine valve and lay shaft of a lever connected with said valve, an eccentric on said lay shaft, an arm connected with said eccentric and by a rod pivoted thereto with said lever, and having an intermediate link connection with a suitable support, substantially as and for the purposes set forth.

7. The combination with an engine valve and lay shaft connected with the crank shaft of the engine, of a lever connected with said valve, an eccentric on the lay shaft, an arm connected at one end with said lever and at the other with said eccentric, a bell crank lever, one arm of which links said arm to a suitable support, and trip blocks or steels carried by levers one of which is fulcrumed to the valve opening lever and the other to a suitable support, the former being connected with the governor and the latter with said bell crank lever, substantially as and for the purposes set forth.

8. The combination with an engine valve, of a lever connected therewith and having a connection with the crank shaft of the engine for opening said valve, and trip levers formed or provided with trip blocks or steels, one fulcrumed to a suitable support and having a connection with the crank shaft and the other fulcrumed to the valve opening lever and having a connection with the governor, substantially as and for the purposes set forth.

9. The combination with an engine valve of a lever connected therewith and having a connection with the crank shaft for opening said valve, trip blocks or steels constituting a fulcrum support for said lever in opening said valve, and a lever carrying one of said blocks or steels and provided with an oil well in which they are contained, substantially as and for the purposes set forth.

10. The combination with an engine valve, of a lever connected therewith and having a connection with the crank shaft for opening said valve, and bell crank levers provided with trip blocks or steels which constitute the fulcrum support of the valve opening lever, one of said bell crank levers being fulcrumed to the valve opening lever and having a connection with the governor and the other provided with an oil well around said trip blocks or steels, being fulcrumed to a fixed support and connected with the crank shaft, substantially as and for the purposes set forth.

11. The combination with an engine valve, of a lever connected therewith and having a connection with the crank shaft for opening said valve and trip blocks or steels constituting the fulcrum support of said lever in opening said valve and having when in engagement, concentric pivotal connections, one with said lever and the other with a suitable support, substantially as and for the purpose set forth.

12. The combination with an engine valve, of a lever connected at one end therewith and at the opposite end with the crank shaft for opening said valve, and trip blocks or steels constituting a fulcrum support for said lever in opening said valve, one of said blocks or steels being movable and having a connection with the crank shaft whereby one block or steel is withdrawn from engagement with the other and the valve is allowed to close, substantially as and for the purposes set forth.

13. The combination with an engine valve, of a lever connected therewith at one end and at the opposite end with the crank shaft for opening said valve, a suitable device for closing the valve when released, trip blocks or steels constituting the fulcrum of said lever and having connections, one with said lever and the other with a suitable support, said blocks or steels being movable into and out of range with each other transversely to the movement of said lever in opening and closing said valve, one block or steel having a connection with the crank shaft and the other with the governor, whereby more or less engagement of said blocks or steels is produced and they are disengaged sooner or later to permit the closing of said valve according to the speed of the engine, substantially as and for the purposes set forth.

14. The combination in an engine of a puppet admission valve, valve operating gear constructed and arranged to permit said valve to open outwardly, a valve seat loosely seated in an opening into the cylinder and capable of opening outwardly with said valve, substantially as and for the purposes set forth.

15. The combination in an engine of an outwardly opening double beat puppet admission valve, valve operating gear constructed and arranged to permit said valve to open, and a double valve seat having a closed end seated in an opening into the cylinder and capable of opening outwardly with the valve, substantially as and for the purposes set forth.

16. The combination in an engine of a puppet admission valve, a lever connected at one end with the valve stem and at the opposite end with the lay shaft, and trip blocks constituting a fulcrum support at an intermediate point in said lever for opening said valve, one of said blocks being movable into and out of range with the other and having a connection with the lay shaft whereby the fulcrum support of said lever is withdrawn at the desired point in the stroke of the piston and the valve is permitted to close, substantially as and for the purposes set forth.

17. The combination in an engine of a puppet admission valve, a lever connected at one end with the valve stem and at the other end with the lay shaft, and trip blocks constituting a fulcrum support for said lever for opening said valve, one of said blocks being movably connected with said lever and the other with a fixed support, and one having a connection with the lay shaft and the other with the governor, whereby the fulcrum support of said lever is withdrawn at a variable point in the stroke of the piston according to the speed of the engine, substantially as and for the purposes set forth.

18. The combination with an engine valve, of a lever connected therewith and arranged to open the same, trip blocks constituting a fulcrum support for said lever in opening said valve, one being movable transversely to the movement of said lever into and out of range with the other, and an oil well in which said trip blocks operate, substantially as and for the purposes set forth.

19. In an engine, the combination with an exhaust valve and chamber, of a removable valve seat fitted in an opening into the cylinder and provided with a threaded stem, and an internally threaded flanged sleeve fitted in an opening in the valve chamber cover and screwed upon said stem, substantially as and for the purposes set forth.

20. In an engine, the combination with the cylinder, exhaust valve and valve chamber, of a valve seat fitted to an opening into the cylinder and provided with a hollow threaded stem through which the valve stem passes, and an internally threaded flanged sleeve fitted in an opening in the valve chamber cover and screwed upon said threaded stem, said sleeve being extended outside of the valve chamber and provided with means for turning the same, substantially as and for the purposes set forth.

21. In an engine, the combination with the cylinder, exhaust valve and valve chamber, of a valve seat fitted to and opening into the cylinder and provided with an externally threaded hollow stem through which the valve stem passes, and an internally threaded flanged sleeve screwed upon the valve seat stem and fitted in an opening in the valve chamber cover, with its flange fitted to and bearing against the inside of said cover, said sleeve projecting outside of the valve chamber and being formed with a stuffing box for the valve stem, substantially as and for the purposes set forth.

22. In an automatic cut-off engine, the combination of trip blocks or steels and an oil well in which they are contained, substantially as and for the purposes set forth.

23. In an engine, the combination with a valve and lay shaft provided with a crank or eccentric, of a valve opening lever connected with said valve, and an arm connected at or near one end by a box or strap with said crank or eccentric and at or near the other end with said valve opening lever, and having an intermediate suspended link connection with a fixed support at a point approximately in line with the crank or eccentric and lever connections of said arm, substantially as and for the purposes set forth.

In testimony that I claim the foregoing as my own I affix my signature in presence of two witnesses.

BRUNO V. NORDBERG.

Witnesses:
CHAS. L. GOSS,
E. C. ASMUS.